United States Patent
Nakano (10) Patent No.: US 9,105,928 B2
(45) Date of Patent: Aug. 11, 2015

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicant: Masatsugu Nakano, Minoh (JP)

(72) Inventor: Masatsugu Nakano, Minoh (JP)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 221 days.

(21) Appl. No.: 13/684,948

(22) Filed: Nov. 26, 2012

(65) Prior Publication Data

US 2013/0136993 A1 May 30, 2013

(30) Foreign Application Priority Data

Nov. 25, 2011 (JP) ................................ 2011-257976
Aug. 6, 2012 (KR) ........................ 10-2012-0085986

(51) Int. Cl.
*H01M 4/13* (2010.01)
*H01M 4/505* (2010.01)
*H01M 4/04* (2006.01)
*H01M 4/525* (2010.01)
*C01G 45/12* (2006.01)
*C01G 53/00* (2006.01)

(52) U.S. Cl.
CPC ............ *H01M 4/505* (2013.01); *C01G 45/1257* (2013.01); *C01G 53/50* (2013.01); *H01M 4/0471* (2013.01); *H01M 4/525* (2013.01); *C01P 2004/03* (2013.01); *C01P 2004/50* (2013.01); *C01P 2006/40* (2013.01); *Y02E 60/122* (2013.01)

(58) Field of Classification Search
None
See application file for complete search history.

(56) References Cited

U.S. PATENT DOCUMENTS

| 2007/0202410 | A1 | 8/2007 | Takeuchi et al. | |
|---|---|---|---|---|
| 2009/0155694 | A1 | 6/2009 | Park | |
| 2009/0224212 | A1* | 9/2009 | Manthiram et al. | 252/503 |
| 2010/0209771 | A1* | 8/2010 | Shizuka et al. | 429/207 |
| 2011/0217592 | A1 | 9/2011 | Gunji et al. | |
| 2011/0300418 | A1 | 12/2011 | Kim et al. | |
| 2012/0015249 | A1 | 1/2012 | Awano et al. | |
| 2012/0263998 | A1* | 10/2012 | Thackeray et al. | 429/156 |

FOREIGN PATENT DOCUMENTS

| JP | 2006-86116 | 3/2006 |
|---|---|---|
| JP | 2006-127923 | 5/2006 |
| JP | 2007-042385 | 2/2007 |
| JP | 2007-141527 | 6/2007 |
| JP | 2010-033830 | 2/2010 |
| JP | 2010-218884 | 9/2010 |
| JP | 2010-282874 | 12/2010 |
| JP | 2001-155728 | 6/2011 |
| JP | 2011-187190 | 9/2011 |
| JP | 2011-258556 | 12/2011 |
| KR | 10-2009-0066021 | 6/2009 |

* cited by examiner

*Primary Examiner* — Patrick Ryan
*Assistant Examiner* — Jose Colucci Rios
(74) *Attorney, Agent, or Firm* — Lee & Morse, P.C.

(57) ABSTRACT

A positive active material for a rechargeable lithium battery may include a solid solution represented by Chemical Formula 1.

$$xLi_2MnO_3 \cdot (1-x)LiMO_2 \quad \text{[Chemical Formula 1]}$$

In Chemical Formula 1, $0.1 \leq x \leq 0.6$, and M and may be a metal composite compound represented by Chemical Formula 2.

$$Mn_aCo_bNi_c. \quad \text{[Chemical Formula 2]}$$

In Chemical Formula 2, $0.3 \leq a \leq 0.5$, $0.05 \leq b \leq 0.3$, $0.3 \leq c \leq 0.55$, and $a+b+c=1$.

13 Claims, 5 Drawing Sheets

FIG.1A

Before firing

FIG.1B

After firing (addition of molybdate salt)

FIG.1C

After firing (no addition of molybdate salt)

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATIONS

This application claims priority under 35 U.S.C. §119 to Japanese Application No. 2011-257976 filed in the Japanese Patent Office on Nov. 25, 2011, the entire contents of which is hereby incorporated by reference.

This application also claims priority under 35 U.S.C. §119 to Korean Patent Application No. 10-2012-0085986 filed in the Korean Intellectual Property Office on Aug. 6, 2012, the entire contents of which is hereby incorporated by reference.

BACKGROUND

1. Field

Embodiments relate to a positive active material for a rechargeable lithium battery, a method of preparing the same, and a rechargeable lithium battery including the same.

2. Description of the Related Art

Lithium ion rechargeable batteries may be used in, e.g., a portable electronic device such as, e.g., a mobile phone, a notebook PC, and the like, and/or an automobile, and the like.

SUMMARY

Embodiments are directed to a positive active material for a rechargeable lithium battery that may include a solid solution represented by Chemical Formula 1, the solid solution may include primary particles and a secondary particle, and the primary particles may have a number average particle diameter of about 0.5 μm or more.

$$xLi_2MnO_3 \cdot (1-x)LiMO_2 \quad \text{[Chemical Formula 1]}$$

In Chemical Formula 1, 0.1≤x≤0.6, and M may be a metal composite compound represented by Chemical Formula 2.

$$Mn_aCo_bNi_c \quad \text{[Chemical Formula 2]}$$

In Chemical Formula 2, 0.3≤a≤0.5, 0.05≤b≤0.3, 0.3≤c≤0.55, and a+b+c=1.

The primary particles may have a number average particle diameter of about 0.5 μm to about 5 μm.

The secondary particle may be an agglomeration of more than one of the primary particles.

In Chemical Formula 1, x may be within the range of 0.2≤x≤0.5.

Embodiments are also directed to a method of preparing a positive active material for a rechargeable lithium battery, which may include preparing a mixed product by mixing a molybdate salt with at least one selected from the group of a solid solution represented by Chemical Formula 1, and a mixture of a precursor of the solid solution represented by Chemical Formula 1 and a lithium compound, and firing the mixed product at a temperature of about 600° C. to about 1050° C., wherein the molybdate salt may be mixed in an amount of about 3 parts by weight to about 60 parts by weight based on 100 parts by weight of the solid solution or 100 parts by weight of the precursor of the solid solution.

$$xLi_2MnO_3 \cdot (1-x)LiMO_2 \quad \text{[Chemical Formula 1]}$$

In Chemical Formula 1, 0.1≤x≤0.6, and M may be a metal composite compound represented by Chemical Formula 2.

$$Mn_aCo_bNi_c \quad \text{[Chemical Formula 2]}$$

In Chemical Formula 2, 0.3≤a≤0.5, 0.05≤b≤0.3, 0.3≤c≤0.55, and a+b+c=1.

The firing may be performed at a temperature of about 750° C. to about 1050° C.

The molybdate salt may be included in the mixed product in an amount of about 5 parts to about 50 parts by weight based on 100 parts by weight of the solid solution or 100 parts by weight of the precursor of the solid solution.

The method may further include washing the mixed product to remove at least some of the molybdate salt, after the firing.

In Chemical Formula 1, x may be represented by 0.2≤x≤0.5.

After firing the mixed product, the mixed product may include primary particles, and the primary particles may have a number average particle diameter of about 0.5 μm to about 5 μm.

The mixed product may include a secondary particle and the secondary particle may be an agglomeration of more than one of the primary particles.

Preparing the mixed product may include mixing the molybdate salt with the precursor of the solid solution represented by Chemical Formula 1 and the lithium compound, and the precursor of the solid solution represented by Chemical Formula 1 may include a hydroxide including at least one selected from the group of Co, Mn, and Ni.

The lithium compound may be $Li_2CO_3$.

The molybdate salt may include at least one selected from the group of lithium molybdate and sodium molybdate.

The molybdate salt may include $Li_2MoO_4$.

Embodiments are also directed to a positive electrode for a rechargeable lithium battery which may include the positive active material.

The positive electrode may have an electrode density of about 2.8 g/cc or more.

Embodiments are also directed to a rechargeable lithium battery, which may include the positive electrode, a negative electrode, and an electrolyte.

BRIEF DESCRIPTION OF THE DRAWINGS

Features will become apparent to those of skill in the art by describing in detail exemplary embodiments with reference to the attached drawing in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

According to an embodiment, a positive active material may include a solid solution represented by the following Chemical Formula 1 and may be formed by using a molybdate salt (e.g., as a sintering agent), and thus may increase the diameter of primary particles in the solid solution without substantially deteriorating battery characteristics and thereby may increase electrode density.

$$xLi_2MnO_3 \cdot (1-x)LiMO_2 \quad \text{[Chemical Formula 1]}$$

In Chemical Formula 1, $0.1 \leq x \leq 0.6$, and M may include at least one metal selected from Co, Mn, and/or Ni, and the like.

Figure 3:
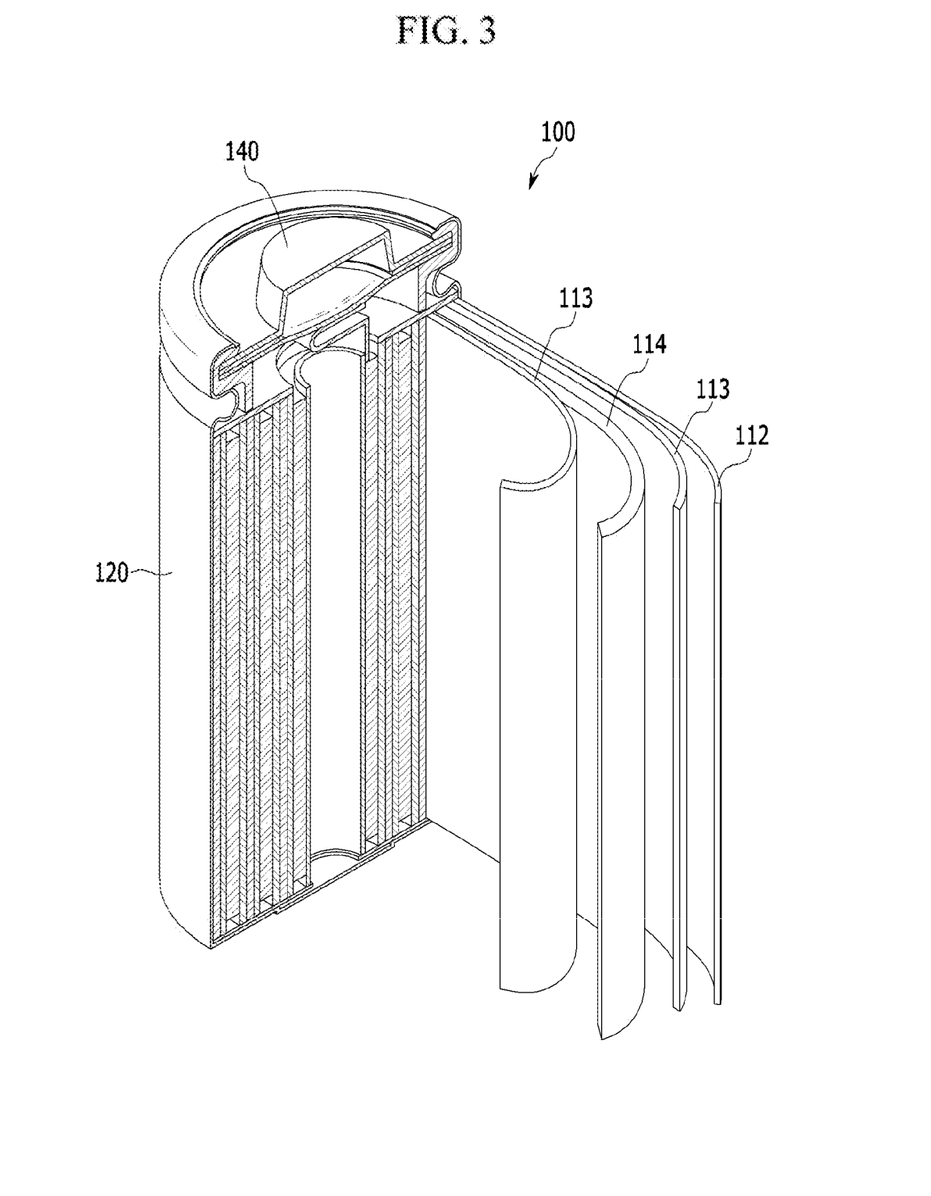
FIG. 3 illustrates a rechargeable lithium battery according to an embodiment.

The rechargeable lithium battery may have a suitable shape, such as, e.g., a shape of a prism, a cylinder, a coin, a button, a sheet, a plate, and the like, and may include a positive electrode, a negative electrode, an electrolyte, and a separator. FIG. 3 illustrates, by way of example, a rechargeable lithium battery 100 having a cylindrical shape and including a negative electrode 112, a positive electrode 114, a separator 113 disposed between the negative and positive electrodes 112 and 114, an electrolyte (not shown) which may be impregnated in the negative and positive electrodes 112 and 114 and/or the separator 113, a battery case 120, and a sealing member 140 sealing the battery case 120.

The positive electrode may include a current collector and a positive active material layer disposed on the current collector, and the positive active material layer may include a positive active material.

The current collector may be, for example, a foil, sheet, net, and the like made of aluminum, copper, nickel, stainless steel, titanium, and the like; a sheet, net and the like made of a carbon fiber; and a polymer substrate coated with a conductive metal.

The polymer substrate may be made of, e.g., polyethylene terephthalate, polyimide, polytetrafluoroethylene, polyethylene naphthalate, polypropylene, polyethylene, polyester, polyvinylidene fluoride, polysulfone, a copolymer thereof, and/or a mixture thereof.

In addition, the positive electrode may be fabricated by compressing the following positive active material into a pellet without using a current collector.

The positive active material may include a solid solution represented by the following Chemical Formula 1.

$$xLi_2MnO_3 \cdot (1-x)LiMO_2 \quad \text{[Chemical Formula 1]}$$

In Chemical Formula 1, $0.1 \leq x \leq 0.6$. When a solid solution having x within this range is used as a positive active material, the positive active material may be provide a rechargeable lithium battery with a relatively high-capacity and the diameter of primary particles of the solid solution may increase, and thus output characteristic of the rechargeable lithium battery may be improved.

In Chemical Formula 1, M may include at least one metal selected from Co, Mn, and/or Ni, and the like. M may be a metal composite compound represented by the following Chemical Formula 2.

$$Mn_aCo_bNi_c \quad \text{[Chemical Formula 2]}$$

In Chemical Formula 2, $0.3 \leq a \leq 0.5$, $0.05 \leq b \leq 0.3$, $0.3 \leq c \leq 0.55$, and $a+b+c=1$. When a solid solution includes a metal composite compound having a, b, and c values within these ranges respectively, the positive active material may be provide a rechargeable lithium battery with a relatively high-capacity and the diameter of primary particles of the solid solution may increase, and thus output characteristic of the rechargeable lithium battery may be improved.

In this way, the solid solution may be used as a positive active material and may result in a rechargeable lithium battery having a relatively high-capacity.

The solid solution may include primary particles and secondary particles. The primary particles may refer to the solid solution that is in the form of particles (e.g., discrete particles), and when the primary particles agglomerate to form agglomerates, the agglomerates may be referred to as the secondary particles.

The positive active material may be prepared as follows.

At least one selected from a solid solution represented by the above Chemical Formula 1 and/or a mixture of a precursor of the solid solution represented by the above Chemical Formula 1 and a lithium compound may be mixed with a molybdate salt to prepare a mixture, and the mixture may be fired.

The molybdate salt may be used as a sintering agent to prepare the positive active material, and thus the diameter of primary particles in the solid solution may increase without substantially deteriorating battery characteristics (such as storage, output, cycle characteristics, and the like).

The primary particle of the solid solution may have a number average particle diameter of greater than or equal to about 0.5 μm, more particularly about 0.5 μm to about 5 μm, and even more particularly about 0.5 μm to about 3 μm.

The number average particle diameter of primary particles of the solid solution may be measured by, for example, examining the positive active material layer with a scanning electron microscope (SEM), image-treating the SEM image taken in various perspectives, and calculating number average particle diameters of the primary particles in each image.

The primary particles of the solid solution may have an increased diameter, and thus the positive active material may increase positive electrode density (e.g., to greater than or equal to about 2.8 g/cc). Accordingly, battery capacity per unit volume may be increases, and thus a rechargeable lithium battery having relatively high-capacity may be realized.

The positive electrode may include, for example, an additive such as a conductive agent, a binder, a filler, a dispersing agent, and/or an ion conductive agent, and the like, in addition to the positive active material.

The conductive agent may include, for example, graphite, carbon black, acetylene black, ketjen black, a carbon fiber, and/or a metal powder, and the like, and the binder may include, for example, polytetrafluoroethylene, polyvinylidene fluoride, and/or polyethylene, and the like.

The binder, filer, dispersing agent, and ion conductive agent may be a suitable material.

The negative electrode may include a current collector and a negative active material layer disposed on the current collector and formed of a negative active material.

The current collector may be, e.g., a foil made of copper, nickel, stainless steel, titanium, and the like.

The negative active material may include, for example, a graphite-based carbon material, silicon, tin, a silicon alloy, a tin alloy, a silicon oxide, and/or a lithium vanadium oxide, and the like, and particularly silicon, tin, or a compound alloyed with lithium such as a silicon alloy, a tin alloy, and the like, a silicon oxide, and/or a lithium vanadium oxide, and the like.

The graphite-based carbon material may have capacity density of about 560 mAh/cm$^3$ to about 630 mAh/cm$^3$, and the silicon, tin, silicon alloy, tin alloy, silicon oxide and lithium vanadium oxide may have capacity density of greater than or equal to about 850 mAh/cm$^3$. These may be used, and thus may provide down-size and relatively high-capacity of a rechargeable lithium battery.

The negative active material may be used singularly or in a mixture of two kinds or more.

The negative electrode may include, for example, an additive such as a conductive agent, a binder, a filler, a dispersing agent, and/or an ion conductive agent, and the like, in addition to the negative active material.

The electrolyte may be, for example, a non-aqueous electrolyte including a lithium salt dissolved in an organic solvent, a polymer electrolyte, an inorganic solid electrolyte, and/or a composite material of the polymer electrolyte and the inorganic solid electrolyte, and the like.

The organic solvent of the non-aqueous electrolyte may include, for example, a cyclic carbonate such as ethylene carbonate, propylene carbonate, vinylene carbonate, and the like; a linear carbonate such as dimethyl carbonate, diethylcarbonate, methylethyl carbonate, and the like; γ-lactones such as γ-butyl lactone, and the like; linear ethers such as 1,2-dimethoxy ethane, 1,2-diethoxy ethane, ethoxy methoxy ethane, and the like; cyclic ethers such as a tetrahydrofuran; and/or nitriles such as acetonitriles, and the like.

The organic solvent may be used singularly or in a mixture of two kinds or more.

The lithium salt of the non-aqueous electrolyte may be included as a solute, and may include, for example, $LiAsF_6$, $LiBF_4$, $LiPF_6$, $LiAlCl_4$, $LiClO_4$, $LiCF_3SO_3$, $LiSbF_6$, LiSCN, LiCl, $LiC_6H_5SO_3$, $LiN(CF_3SO_2)_2$, $LiC(CF_3SO_2)_3$, and/or $LiC_4P_9SO_3$, and the like.

The lithium salt may be used in a concentration of about 0.6M to about 2.0M, and particularly about 0.7M to about 1.6M. When the lithium salt is used within the above concentration, an improved viscosity may be obtained, and conductivity of lithium ions may be improved.

The separator may be, e.g., a porous film made of polyolefin such as, e.g., polypropylene, polyethylene, and the like.

A polyamide layer may be formed on the porous film and may include an inorganic metal compound.

Hereinafter, an exemplary method of manufacturing a rechargeable lithium battery is described.

A positive electrode may be obtained by forming a positive active material layer on a current collector. Hereinafter, an exemplary method of preparing a positive active material for the positive active material layer is described.

First, a solid solution represented by the above Chemical Formula 1 or a mixture of precursor of the solid solution and a lithium compound may be mixed with a molybdate salt.

The precursor of the solid solution may include, for example, a metal hydroxide including at least one metal selected from Co, Mn, and/or Ni, and the like.

The lithium compound may include, for example, $Li_2CO_3$ and the like.

The molybdate salt may be a suitable material (e.g., a metal molybdate salt) and may include, for example, lithium molybdate ($Li_2MoO_4$) and/or sodium molybdate ($Na_2MoO_4$), and the like.

The molybdate salt may increase the particle diameter of the solid solution without substantially deteriorating battery characteristics.

The molybdate salt may be used in an amount of about 3 parts to about 60 parts by mass based on 100 parts by mass of the solid solution or 100 parts by mass of the precursor of the solid solution, and particularly in an amount of about 10 to about 30 parts by mass. When the molybdate salt is used within this range, the diameter of the primary particle of the solid solution may increase and the solid solution (when used as a positive active material) may also provide increased positive electrode density and a improved output characteristic.

Then, the mixture including the molybdate salt may be fired.

The firing may be performed at a temperature ranging from about 600° C. to about 1050° C., and particularly about 650° C. to about 1000° C. When the firing is performed within the range, the solid solution may have a larger primary particle diameter, an increased positive electrode density, and improved output characteristic.

The firing time may be a suitable time, e.g., in a range of about 3 hours to about 12 hours. When the firing is performed within the time range, improved particles may be prepared.

After the firing, the fired mixture, which may include the molybdate salt, may be washed with water to remove at least some of (or substantially all of) the molybdate salt, and then dried. The drying may be performed, for example, at about 80° C. for a night (e.g., for about 8 to 12 hours), and thus a positive active material may include a solid solution particle with an increased diameter.

Then, the positive active material may be mixed with a suitable additive such as a conductive agent, a binder, a filler, a dispersing agent, and/or an ion conductive agent, and the like, and the mixture may be added to a solvent such as water, and/or an organic solvent, and the like, thereby preparing a slurry or a paste.

The slurry or paste may be coated on the current collector (e.g., with a doctor blade method and the like), dried, and compressed (e.g., with a roller and the like), thereby forming the positive active material layer on the current collector.

The positive electrode may have density of greater than or equal to about 2.8 g/cc, and particularly ranging from about 3.0 to about 3.3 g/cc. When the positive electrode has density within this range, a rechargeable lithium battery may have an improved output characteristic.

Next, a method of fabricating a negative electrode will be described. The negative electrode may be fabricated by forming a negative active material layer on a current collector.

The negative active material may be mixed with a suitable additive such as a conductive agent, a binder, a filler, a dispersing agent, and/or an ion conductive agent, and the like, and the mixture may be added to a solvent such as water, and/or an organic solvent, and the like, thereby preparing a slurry or a paste.

The slurry or paste may be coated on a current collector (e.g., with a doctor blade method and the like), dried, and compressed (e.g., with a roller and the like), thereby forming a negative active material layer on the current collector.

As for an electrolyte, a non-aqueous electrolyte prepared by dissolving a lithium salt in an organic solvent may be used (by way of example). The organic solvent may be prepared by mixing, for example, a cyclic carbonate and a linear carbonate in a predetermined ratio and dissolving the lithium salt in a predetermined concentration in the mixed solvent.

In addition, the electrolyte may include a solid electrolyte such as a polymer electrolyte, an inorganic solid electrolyte, and/or a composite material of the polymer electrolyte and the inorganic solid electrolyte, and the like.

On the other hand, when the non-aqueous electrolyte is used as the electrolyte, a rechargeable lithium battery may be fabricated by disposing a separator between the aforementioned positive and negative electrodes, winding and/or assembling the electrode assembly according to a battery case shape (such as a cylinder shape, a flat shape, and the like), housing the wound and/or assembled electrode assembly in a battery case, and injecting the non-aqueous electrolyte in the battery case.

In addition, if a solid electrolyte is used as the electrolyte, it may be laminated on an electrode to fabricate a rechargeable lithium battery.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Examples 1 to 10 and Comparative Examples 1 to 10

A solid solution represented by the following Chemical Formula 1 was used as a positive active material.

$$x Li_2MnO_3 \cdot (1-x)LiMO_2$$ [Chemical Formula 1]

In the above Chemical Formula 1, $0.2 \leq x \leq 0.5$, and M is a metal composite compound represented by the following Chemical Formula 2.

$$Mn_aCo_bNi_c$$ [Chemical Formula 2]

In the above Chemical Formula 2, $0.3 \leq a \leq 0.5$, $0.1 \leq b \leq 0.3$, $0.3 \leq c \leq 0.5$, and $a+b+c=1$.

The positive active material was prepared according to the following method.

First, the precursor of the solid solution or a solid solution represented by the above Chemical Formulas 1 (in which x, a, b, and c have a composition provided in the following Table 1) was mixed with a molybdate salt provided in the following Table 1. The molybdate salt was mixed in an amount provided in the following Table 1 based on 100 parts by mass of the solid solution or the precursor of the solid solution. When the precursor of the solid solution was used, metal hydroxides including each Ni, Co, and Mn element were mixed with $Li_2CO_3$, and then the molybdate salt was added thereto.

Then, the mixture of the molybdate salt with the solid solution or the precursor of the solid solution was put in a furnace and fired at a temperature provided in the following Table 1.

The furnace was heated up to the temperature in following Table 1 for about 2.5 hours.

After the firing, the mixture of the molybdate salt with the solid solution or the precursor of the solid solution was taken out of the furnace and then washed with water and dried at 80° C. for a night, thereby obtaining each positive active material according to Examples 1 to 10 and Comparative Examples 1 to 9. The positive active material according to Comparative Example 10 was not fired.

Then, 90 wt % of the positive active material was mixed with 5 wt % of acetylene black and 5 wt % of polyvinylidene fluoride (PVdF) in N-methyl-2-pyrrolidone, thereby preparing a positive active material composition paste. The positive active material composition paste was coated on an aluminum foil, thereby fabricating a positive electrode.

As for a negative active material, 95 wt % of the graphite powder was mixed with 5 wt % of polyvinylidene fluoride (PVDF) in N-methyl-2-pyrrolidone, thereby preparing a negative active material composition paste. The negative active material composition paste was coated on a copper foil, thereby fabricating a negative electrode.

Next, a polypropylene separator was disposed between the positive and negative electrodes, and a non-aqueous electrolyte was injected therein, thereby fabricating each rechargeable lithium battery cell according to Examples 1 to 10 and Comparative Examples 1 to 10.

The non-aqueous electrolyte was prepared by mixing ethylene carbonate and diethylcarbonate in a volume ratio of 3:7 and dissolving $LiPF_6$ in a concentration of 1.10 mol/L in the mixed solvent.

Evaluation 1: Positive Active Material and Positive Electrode

The rechargeable lithium battery cells according to Examples 1 to 10 and Comparative Examples 1 to 10 were measured for the number average particle diameter of the primary particles of the solid solution in the positive active material. The measurement was used to calculate electrode density of the positive electrode. The obtained number average particle diameter and the electrode density were provided in the following Table 1.

The number average particle diameter of the primary particles of the solid solution was measured by randomly selecting 100 particles based on a scanning electron microscope (SEM) image enlarged with a predetermined ratio and using an image interpretation software. In addition, the electrode density of the positive electrode was calculated from coating mass of the electrodes for a coin cell punched of a 15 mmΦ and their thickness after the compression. That is, the electrode density of the positive electrode was obtained by cutting the positive electrode in the form of a coin type with a 15 mm diameter and by dividing a weight (g) of the positive active material layer on the cut positive electrode with (15 diameter*its thickness after the compression)(weight of the positive material layer/(15 diameter*its thickness after the compression)).

Referring to the following Table 1, the battery cells according to Examples 1 to 10 had greater than or equal to 0.5 μm as the number average particle diameter of the primary particle of the solid solution and greater than or equal to 2.9 g/cc as the positive electrode density. On the other hand, Comparative Examples 1 and 10 (including no molybdate salt), Comparative Example 2 (including molybdate salt in a small amount), and Comparative Example 4 (fired at a relatively low temperature) had a relatively small number average particle diameter of the primary particles of the solid solution and a relatively low positive electrode density.

In addition, the solid solutions according to Example 1 and Comparative Example 1 were examined using a scanning electron microscope (SEM). The results are provided in FIGS. 1A to 1C.

Figure 1A:
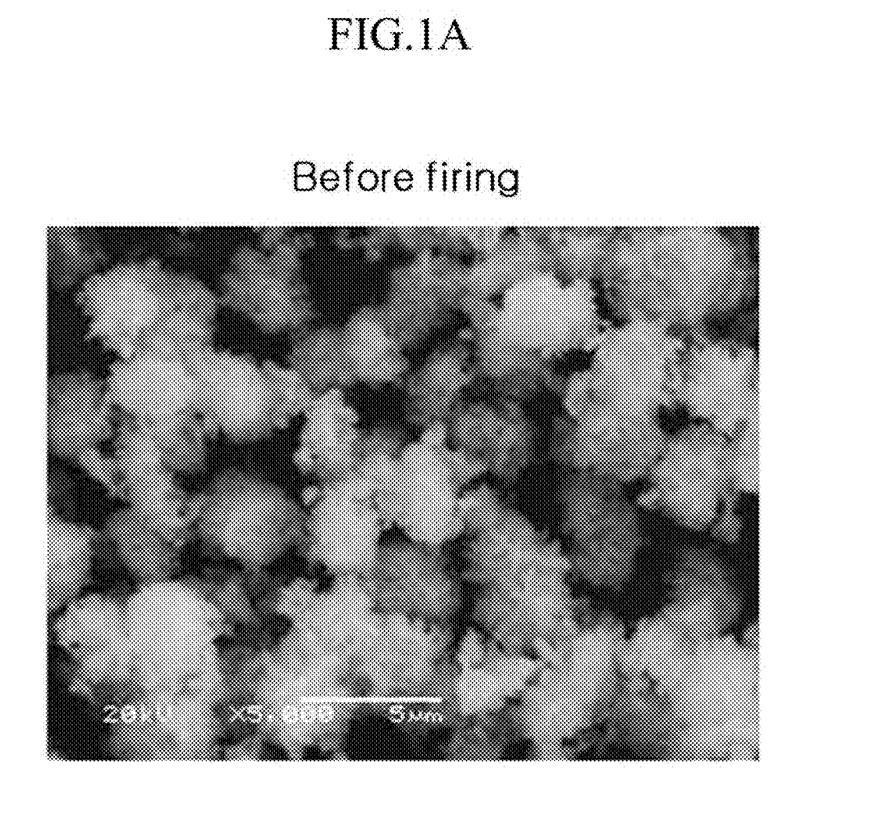
FIG. 1A illustrates a SEM image of a solid solution particle before the firing according to Example 1.
Figure 1B:
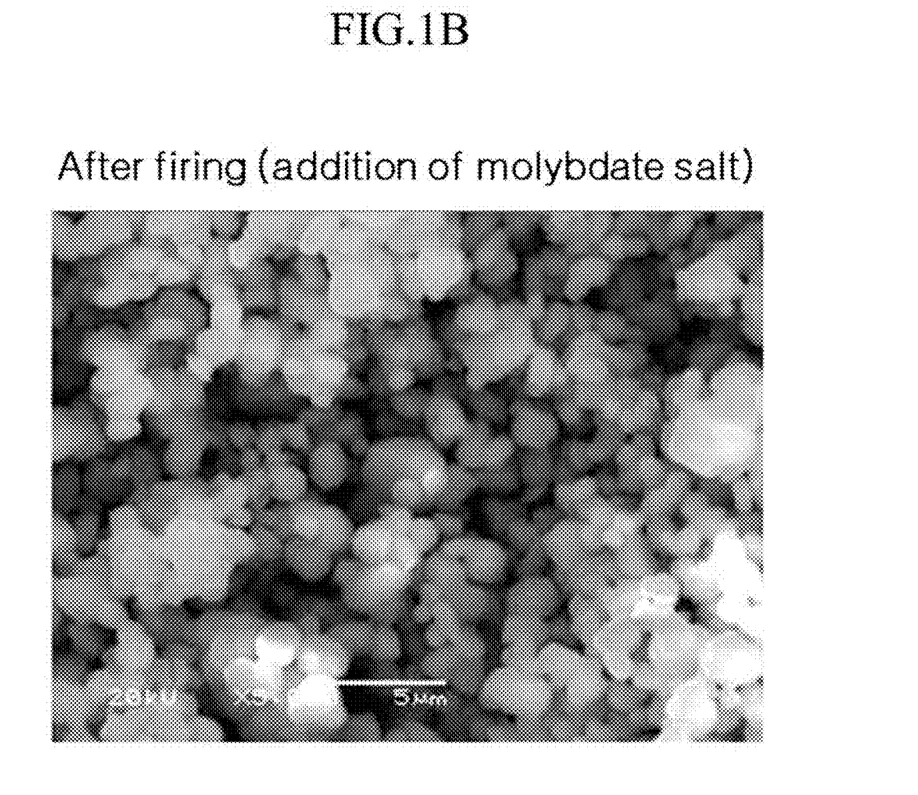
FIG. 1B illustrates a SEM image of a solid solution particle after the firing according to Example 1.
Figure 1C:
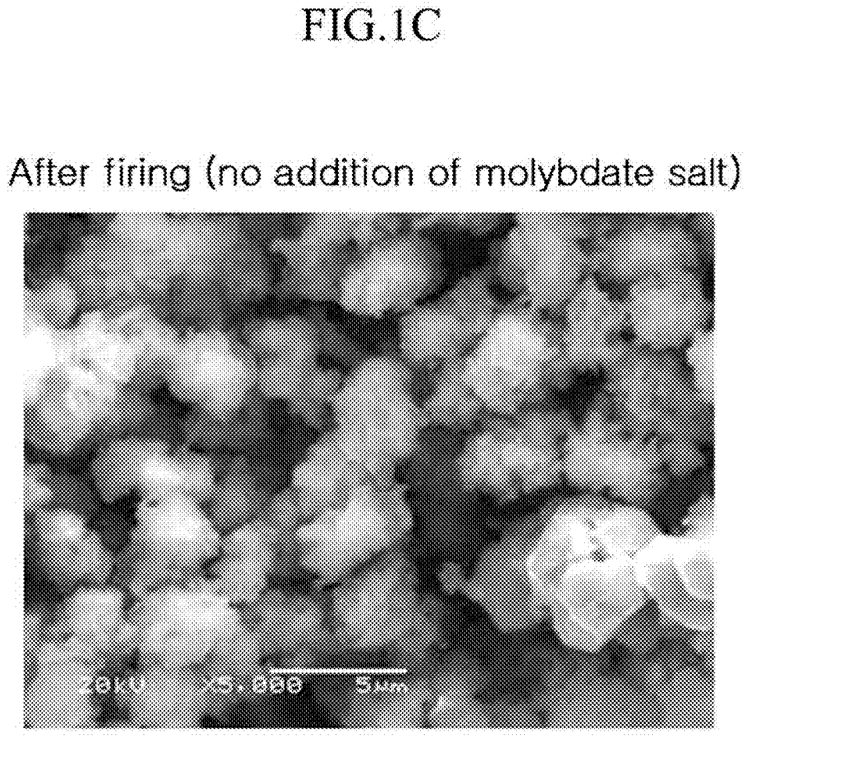
FIG. 1C illustrates a SEM image of a solid solution particle after the firing according to Comparative Example 1.

FIG. 1A illustrates a SEM image of the solid solution particles before the firing according to Example 1, FIG. 1B illustrates a SEM image of the solid solution particles after the firing according to Example 1, and FIG. 1C illustrates a SEM image of the solid solution particles after the firing according to Comparative Example 1.

In greater detail, FIG. 1A illustrates the state of the solid solution particles before the firing, FIG. 1B illustrates the state of the solid solution particles with a molybdate salt after being fired at 1000° C., and FIG. 1C illustrates the state of the solid solution particles including no molybdate salt after being fired at 1000° C.

Referring to FIGS. 1A to 1C, Example 1 has relatively small primary particles of the solid solution before the firing. However, when a mixture is prepared by adding a molybdate salt to the solid solution and firing the mixture, primary particles in the solid solution increased in size. On the other hand, when a solid solution is fired without using a molybdate salt according to Comparative Example 1, the solid solution had substantially no increase in size of the primary particle, and thus substantially no increased particle diameter.

Accordingly, when a positive active material including a solid solution is fired with a molybdate salt (e.g., as a sintering agent), the solid solution had an increased primary particles diameter, and thus an increased positive electrode density.

Evaluation 2: Evaluation of Rechargeable Lithium Battery Cell

The rechargeable lithium battery cells according to Examples 1 to 10 and Comparative Examples 1 to 10 were charged with a constant current (0.1 C) and a constant voltage (4.75V) at 25° C. and discharged with a constant current down to a discharge end voltage of 2.0V, and then measured regarding initial discharge capacity.

In addition, the initial discharge capacity and the positive electrode density were multiplied together to calculate capacity per unit volume (mAh/cc) of the rechargeable lithium battery cells.

The initial discharge capacity results are provided in the following Table 1 and FIG. 2, and the capacity per unit volume is provided in the following Table 1.

Referring to the following Table 1, the rechargeable lithium battery cells according to Comparative Examples 1 to 10 had lower initial discharge capacity and lower capacity per unit volume than the ones according to Examples 1 to 10.

Figure 2:
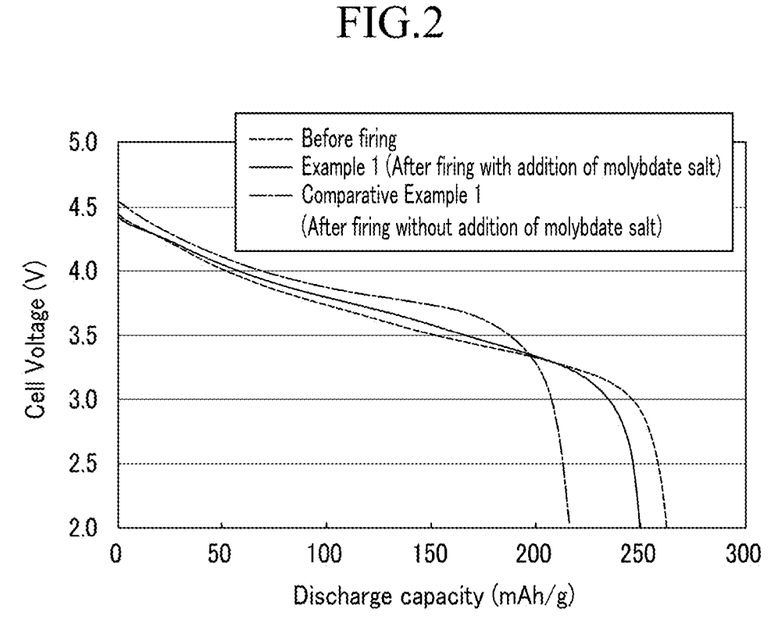
FIG. 2 illustrates a graph of initial discharge capacity of rechargeable lithium batteries according to Example 1 and Comparative Example 1.

FIG. 2 illustrates a graph of initial discharge capacity of the rechargeable lithium battery cells according to Example 1 and Comparative Example 1. Referring to FIG. 2, the capacity deterioration from the initial discharge capacity before and after the firing was evaluated. In the graph of FIG. 2, the vertical axis is cell voltage, and the horizontal axis is discharge capacity. FIG. 2 illustrates initial discharge capacity when solid solution particles before the firing were used as a positive active material.

Referring to FIG. 2, the lithium rechargeable battery cell including a solid solution including a molybdate salt as a sintering agent and fired according to Example 1 had relatively reduced capacity deterioration (i.e., initial discharge capacity decreased by a relatively small amount) when compared with the lithium rechargeable battery cell using a solid solution before the firing. In contrast, the lithium rechargeable battery cell including a solid solution fired without using a molybdate salt according to Comparative Example 1 had relatively increased capacity deterioration (i.e., initial discharge capacity decreased by a relatively large amount) when compared with the lithium rechargeable battery cell using a solid solution before the firing.

Accordingly, a positive active material including a solid solution fired using a molybdate salt had relatively reduced capacity deterioration due to the firing, and thus substantially suppressed deterioration of battery characteristics.

Comparative Example 3 (which included a molybdate salt in a relatively large amount), Comparative Example 5 (which was fired at a relatively high temperature), Comparative Example 6 (which included a solid solution having a relatively small amount of Li in its final structure), Comparative Example 7 (which included a solid solution having a relatively large amount of Li in its final structure), and Comparative Examples 8 and 9 (which respectively included a solid solution having a relatively small or large amount of Co and Ni in its final structure) had relatively low initial discharge capacity and a relatively low capacity per unit volume. A solid solution was fired at a relatively high temperature in Comparative Example 5, and thus a positive active material included primary particles with a relatively large diameter and had a relatively reduced amount of Li, and thus has a decreased initial discharge capacity.

In Table 1, Comp. Ex. refers to Comparative Example, and Ex. refers to Example.

TABLE 1

| | x | a | b | c | Type of starting material | Molybdate salt | Amount of molybdate salt (parts by weight) | Firing temperature (° C.) | Number average particle diameter of primary particle (μm) | Electrode density (g/cc) | Initial Discharge capacity (mAh/g) | Capacity per unit volume (mAh/cc) |
|---|---|---|---|---|---|---|---|---|---|---|---|---|
| Comp. Ex. 1 | 0.35 | 0.4 | 0.2 | 0.4 | Solid solution | — | — | 1000 | 0.2 | 2.6 | 220 | 572 |
| Ex. 1 | 0.35 | 0.4 | 0.2 | 0.4 | Solid solution | $Li_2MoO_4$ | 25 | 1000 | 0.8 | 3.0 | 250 | 750 |
| Ex. 2 | 0.35 | 0.4 | 0.2 | 0.4 | Precursor of solid solution | $Li_2MoO_4$ | 25 | 1000 | 1.0 | 3.0 | 245 | 735 |
| Ex. 3 | 0.35 | 0.4 | 0.2 | 0.4 | Solid solution | $Na_2MoO_4$ | 25 | 1000 | 0.8 | 3.0 | 245 | 735 |
| Comp. Ex. 2 | 0.35 | 0.4 | 0.2 | 0.4 | Solid solution | $Li_2MoO_4$ | 3 | 1000 | 0.3 | 2.4 | 250 | 600 |
| Ex. 4 | 0.35 | 0.4 | 0.2 | 0.4 | Solid solution | $Li_2MoO_4$ | 5 | 1000 | 0.6 | 2.9 | 252 | 731 |
| Ex. 5 | 0.35 | 0.4 | 0.2 | 0.4 | Solid solution | $Li_2MoO_4$ | 50 | 1000 | 1.0 | 3.2 | 240 | 768 |
| Comp. Ex. 3 | 0.35 | 0.4 | 0.2 | 0.4 | Solid solution | $Li_2MoO_4$ | 60 | 1000 | 2.0 | 3.2 | 200 | 640 |
| Comp. Ex. 4 | 0.35 | 0.4 | 0.2 | 0.4 | Solid solution | $Li_2MoO_4$ | 25 | 650 | 0.2 | 2.4 | 255 | 612 |
| Ex. 6 | 0.35 | 0.4 | 0.2 | 0.4 | Solid solution | $Li_2MoO_4$ | 25 | 800 | 2.5 | 2.9 | 255 | 740 |

TABLE 1-continued

| | x | a | b | c | Type of starting material | Molybdate salt | Amount of molybdate salt (parts by weight) | Firing temperature (° C.) | Number average particle diameter of primary particle (μm) | Electrode density (g/cc) | Initial Discharge capacity (mAh/g) | Capacity per unit volume (mAh/cc) |
|---|---|---|---|---|---|---|---|---|---|---|---|---|
| Comp. Ex. 5 | 0.35 | 0.4 | 0.2 | 0.4 | Solid solution | $Li_2MoO_4$ | 25 | 1100 | 1.5 | 3.1 | 200 | 620 |
| Comp. Ex. 6 | 0.1 | 0.4 | 0.2 | 0.4 | Solid solution | $Li_2MoO_4$ | 25 | 1000 | 0.8 | 3.0 | 200 | 600 |
| Ex. 7 | 0.2 | 0.4 | 0.2 | 0.4 | Solid solution | $Li_2MoO_4$ | 25 | 1000 | 0.8 | 3.0 | 250 | 750 |
| Ex. 8 | 0.5 | 0.4 | 0.2 | 0.4 | Solid solution | $Li_2MoO_4$ | 25 | 1000 | 0.8 | 3.0 | 250 | 750 |
| Comp. Ex. 7 | 0.6 | 0.4 | 0.2 | 0.4 | Solid solution | $Li_2MoO_4$ | 25 | 1000 | 0.8 | 3.0 | 180 | 540 |
| Comp. Ex. 8 | 0.35 | 0.4 | 0.05 | 0.55 | Solid solution | $Li_2MoO_4$ | 25 | 1000 | 0.8 | 3.0 | 170 | 510 |
| Ex. 9 | 0.35 | 0.4 | 0.1 | 0.5 | Solid solution | $Li_2MoO_4$ | 25 | 1000 | 0.8 | 3.0 | 240 | 720 |
| Ex. 10 | 0.35 | 0.4 | 0.3 | 0.3 | Solid solution | $Li_2MoO_4$ | 25 | 1000 | 0.8 | 3.0 | 245 | 735 |
| Comp. Ex. 9 | 0.35 | 0.4 | 0.4 | 0.4 | Solid solution | $Li_2MoO_4$ | 25 | 1000 | 0.8 | 3.0 | 150 | 450 |
| Comp. Ex. 10 | 0.35 | 0.4 | 0.2 | 0.4 | — | — | — | — | 0.2 | 2.4 | 258 | 619 |

By way of summary and review, a solid solution may be used as a positive electrode material for lithium ion rechargeable batteries. However, the solid solution may have a relatively decreased electrode density (as compared with, e.g., $LiCoO_2$), a relatively decreased particle size, and a relatively decreased capacity, when used as a positive electrode material for a lithium ion rechargeable battery.

The foregoing conditions may be substantially avoided by using a positive active material according to one or more of the above embodiments, in which the solid solution may be a $Li_2MnO_3.LiMO_2$-based solid solution, and may be formed by using a molybdate salt. The positive active material according to one or more of the above embodiments may provide relatively increased particle diameter, relatively increased electrode density, and/or relatively increased capacity when used in a lithium rechargeable battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive active material for a rechargeable lithium battery, comprising:
   a solid solution represented by Chemical Formula 1, the solid solution including primary particles and a secondary particle, the primary particles having a number average particle diameter of about 0.5 μm or more, $x Li_2MnO_3.(1-x) LiMO_2$ [Chemical Formula 1]

wherein, in Chemical Formula 1, $0.2 \leq x \leq 0.5$, and M is a metal composite Compound represented by Chemical Formula 2, $Mn_aCo_bNi_c$ [Chemical Formula 2]

wherein, in Chemical Formula 2, $0.3 \leq a \leq 0.5$, $0.05 < b \leq 0.3$, $0.3 \leq c \leq 0.55$, and $a+b+c=1$.

2. The positive active material as claimed in claim 1, wherein the primary particles have a number average particle diameter of about 0.5 μm to about 5 μm.

3. The positive active material as claimed in claim 2, wherein the secondary particle is an agglomeration of more than one of the primary particles.

4. A method of preparing a positive active material for a rechargeable lithium battery, comprising:
   preparing a mixed product by mixing a molybdate salt with at least one selected from the group of:
   a solid solution represented by Chemical Formula 1, and
   a mixture of a precursor of the solid solution represented by Chemical Formula 1 and a lithium compound, $xLi_2MnO_3.(1-x)LiMO_2$ [Chemical Formula 1]

wherein, in Chemical Formula 1, $0.2 \leq x \leq 0.5$, and M is a metal composite compound represented by Chemical Formula 2, $Mn_aCo_bNi_c$ [Chemical Formula 2]

wherein, in Chemical Formula 2, $0.3 \leq a \leq 0.5$, $0.05 \leq b \leq 0.3$, $0.3 \leq c \leq 0.55$, and $a+b+c=1$; and
   firing the mixed product at a temperature of about 750° C. to about 1050° C., wherein the molybdate salt is mixed in an amount of about 5 parts by weight to about 50 parts by weight based on 100 parts by weight of the solid solution or 100 parts by weight of the precursor of the solid solution.

5. The method of preparing a positive active material as claimed in claim 4, further comprising washing the mixed product to remove at least some of the molybdate salt, after the firing.

6. The method of preparing a positive active material as claimed in claim 5, wherein, after firing the mixed product, the mixed product includes primary particles, and the primary particles have a number average particle diameter of about 0.5 μm to about 5 μm.

7. The method of preparing a positive active material as claimed in claim 6, wherein the mixed product includes a secondary particle and the secondary particle is an agglomeration of more than one of the primary particles.

8. The method of preparing a positive active material as claimed in claim 4, wherein:
   preparing the mixed product includes mixing the molybdate salt with the precursor of the solid solution represented by Chemical Formula 1 and the lithium compound, and
   the precursor of the solid solution represented by Chemical Formula 1 includes a hydroxide including at least one selected from the group of Co, Mn, and Ni.

9. The method of preparing a positive active material as claimed in claim 4, wherein the molybdate salt includes at least one selected from the group of lithium molybdate and sodium molybdate.

10. The method of preparing a positive active material as claimed in claim 9, wherein the molybdate salt includes $Li_2MoO_4$.

11. A positive electrode for a rechargeable lithium battery, comprising the positive active material as claimed in claim 1.

12. The positive electrode as claimed in claim 11, wherein the positive electrode has an electrode density of about 2.8 g/cc or more.

13. A rechargeable lithium battery, comprising:
   the positive electrode as claimed in claim 11;
   a negative electrode; and
   an electrolyte.

* * * * *